United States Patent
Yoo (10) Patent No.: US 7,657,156 B2
(45) Date of Patent: Feb. 2, 2010

(54) DIGITAL VIDEO RECORDING APPARATUS AND METHOD

(75) Inventor: Chul Jae Yoo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 818 days.

(21) Appl. No.: 11/322,295

(22) Filed: Jan. 3, 2006

(65) Prior Publication Data

US 2006/0147182 A1      Jul. 6, 2006

(30) Foreign Application Priority Data

Jan. 4, 2005      (KR) .................... 10-2005-0000485

(51) Int. Cl.
*H04N 5/91* (2006.01)
*H04N 7/08* (2006.01)

(52) U.S. Cl. .......................................... 386/83; 386/92
(58) Field of Classification Search ............... 386/83, 386/46, 92, 95, 125

See application file for complete search history.

(56) References Cited

U.S. PATENT DOCUMENTS 7,506,351 B2 *   3/2009   Mori et al. ................ 725/58

* cited by examiner

*Primary Examiner*—Robert Chevalier
(74) *Attorney, Agent, or Firm*—Birch, Stewart, Kolasch & Birch, LLP (57) ABSTRACT

A digital video recording apparatus and method is disclosed. Under the condition in which the user sets information of a preferred program in the digital video recording apparatus, a broadcast stream received by the digital video recording apparatus is analyzed. Based on the results of the analysis, the preferred program can be automatically recorded. In accordance with the digital video recording apparatus and method, there is convenience in that it is unnecessary for the user to directly check there is a preferred program, to be recorded, in the broadcast stream, or to manually enable recording of the preferred program.

11 Claims, 5 Drawing Sheets

DIGITAL VIDEO RECORDING APPARATUS AND METHOD

This application claims the benefit of Korean Patent Application No. 10-2005-0000485, filed on Jan. 4, 2005, which is hereby incorporated by reference as if fully set forth herein.

BACKGROUND OF THE INVENTION

1. Field of the Invention

The present invention relates to a digital video recording apparatus and method, and more particularly, to a digital video recording apparatus and method capable of automatically recording a program desired by the user.

2. Discussion of the Related Art

With the recent development of digital technologies, digitalization of analog broadcasts is being implemented in many countries of the world. In accordance with implementation of broadcasting in a digital mode, multi-channel broadcasting and high-quality broadcasting have been enabled. Meanwhile, digital broadcast receivers have been developed to a level of applied products which have diverse functions in addition to a simple broadcast receiving function.

For examples of such applied products, there are a WEB TV, a digital video recording apparatus, or the like which are currently under development in many countries of the world. Conceptually, the digital video recording apparatus includes a personal video recorder (PVR) and a digital video recorder (DVR). Such a digital video recording apparatus means an apparatus which is internally equipped with a storage units like a hard disk drive (HDD), and is configured to store a digital video stream being currently broadcasted, and to subsequently reproduce the stored broadcast stream.

Even when audio and video data, namely, broadcast data, is repeatedly recorded or reproduced in such a digital video recording apparatus, there is no damage to the audio and video quality of stored broadcast data because the digital video recording apparatus includes an HDD, and stores a digitalized broadcast stream in the HDD, contrary to traditional tapes for analog video cassette tape recorders (VCRs).

The user can view a desired program after immediate-recording or reserved-recording of the program using the above-mentioned conventional digital video recording apparatus. However, conventional recording methods, which are applied to the conventional digital video recording apparatus, are inconvenient in that the user must manually select a desired program to be recorded.

Thus, the digital video recording function of the conventional digital video recording apparatus has a problem in that recording and playback of a program are carried out, only based on a manual selection of the program by the user, without taking into consideration whether or not there is a program preferred by the user.

SUMMARY OF THE INVENTION

Accordingly, the present invention is directed to a digital video recording apparatus and method that substantially obviates one or more problems due to limitations and disadvantages of the related art.

An object of the present invention is to provide a method and an apparatus capable of performing automatic recording of a preferred program for the user selected from various broadcast programs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital video recording method comprises the steps of: (a) receiving information of a preferred program; (b) extracting electronic program guide (EPG) data from a transmitted broadcast stream, and determining whether or not there is data associated with the preferred program in the extracted EPG data; and (c) automatically storing the preferred program when it is determined that there is data associated with the preferred program.

The information of the preferred program at the step (a) may include a category of the preferred program.

The data associated with the preferred program at the step (b) may include at least one of an event information table (EIT) of the broadcast stream, an extended text table (ETT) of the broadcast stream, and data of the broadcast stream in a format of meta data.

The EIT may contain extractable information including at least one of a local start time of at least one program included in the broadcast stream, a length of the program, and a title of the program.

The ETT may contain extractable information including an extended text message which describes at least one program included in the broadcast stream.

In another aspect of the present invention, a digital video recording apparatus comprises: a channel processor for receiving a broadcast stream, and demodulating the received broadcast stream; a user interface for receiving information of a preferred program from a user; a storage unit for storing the received preferred program information; and a controller for analyzing electronic program guide (EPG) data extracted from the broadcast stream in a state in which the preferred program information is stored in the storage unit, and storing the preferred program in the storage unit when the preferred program is broadcasted.

The EPG data analyzed by the controller may include at least one of a local start time of at least one program included in the broadcast stream, a length of the program, and a title of the program, which are contained in an event information table (EIT) of the broadcast stream.

The EPG data analyzed by the controller may include an extended text message which describes at least one program included in the broadcast stream, and is contained in an extended text table (ETT) of the broadcast stream.

In accordance with the present invention, there is convenience in that it is possible to automatically record a program preferred by the user without a requirement for the user to directly check there is a preferred program, to be recorded, in the broadcast stream.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
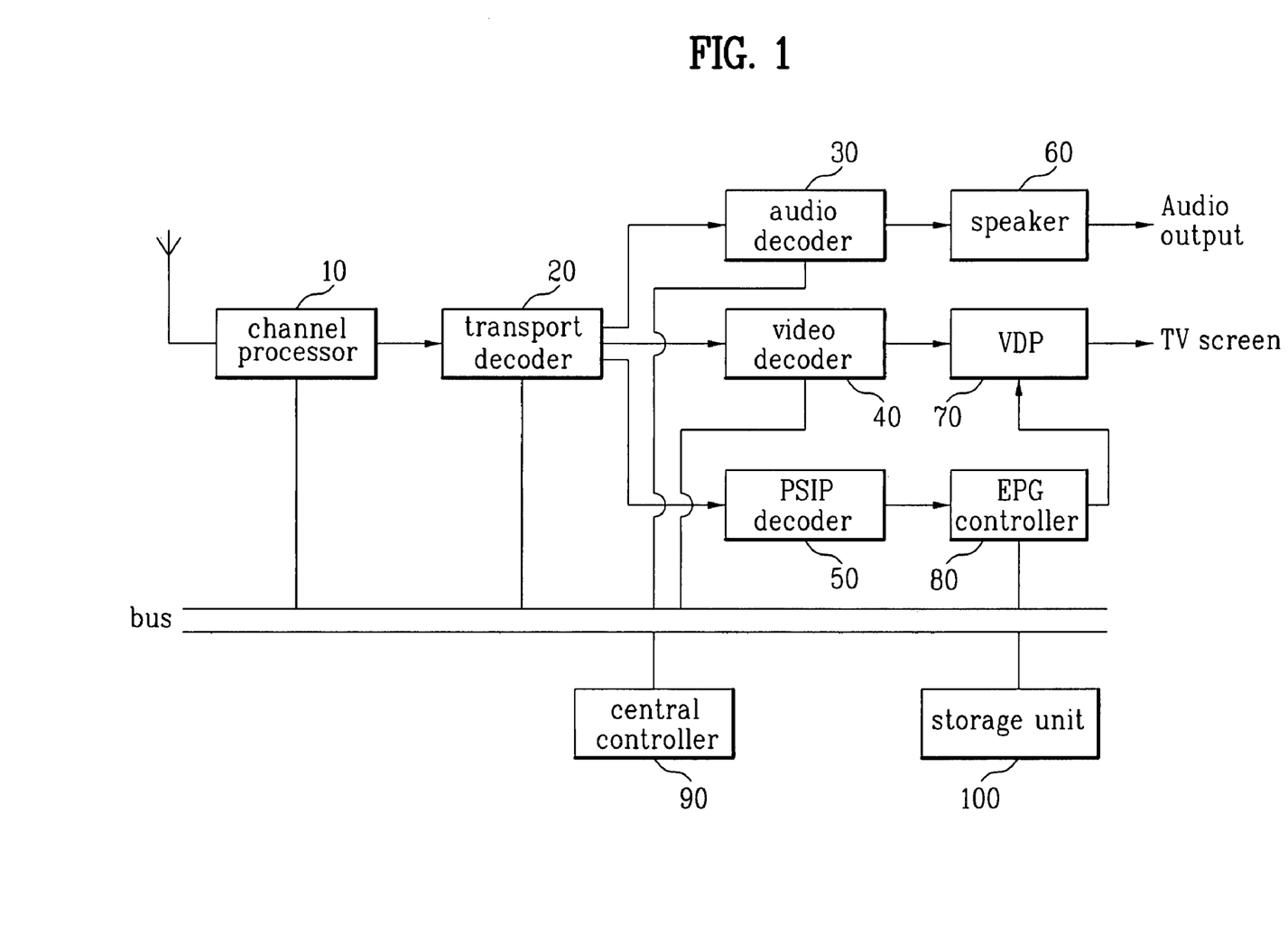
FIG. 1 is a block diagram illustrating a digital video recording apparatus according to an exemplary embodiment of the present invention.

FIG. 1 is a block diagram illustrating a digital video recording apparatus according to an exemplary embodiment of the present invention.

The digital video recording apparatus according to the illustrated exemplary embodiment of the present invention includes a channel processor 10, a transport decoder 20, an audio decoder 30, for example, an audio decoder, a video decoder 40, for example, an video decoder, a program and system information protocol (PSIP) decoder 50, a video display processor (VDP) 70, an electronic program guide (EPG) controller 80, a central controller 90, and a storage unit 100.

The channel processor 10 receives broadcast signals, and demodulates a particular-channel one of the received broadcast signals. The channel processor 10 includes a tuner, a surface acoustic wave (SAW) filter, a down converter, and a signal demodulator which demodulates a broadcast signal.

In the channel processor 10, the tuner converts an input signal to a baseband signal which is, in turn, demodulated in the form of a digital signal by the signal demodulator. The digital signal is output in the form of a transport stream from the channel processor 10.

The transport decoder 20 receives the transport stream, and separates the received transport stream into audio data, video data, and PSIP data.

The audio decoder 30 decodes the audio data output from the transport decoder 20. The decoded audio data is output in the form of audible audio through a speaker 60.

The VDP 70 displays the decoded video data output from the transport decoder 20 in the form of a video image.

The PSIP decoder 50 extracts EPG information from the PSIP data output from the transport decoder 20. The extracted EPG information may be displayed on a screen after being combined with the video image in the VDP 70 under the control of the EPG controller 80 in accordance with a selection by the user, Generally, the storage unit 100 may be an HDD or a flash memory device. The storage unit 100 can store broadcast data received from each of the audio decoder 30, video decoder 40 and PSIP decoder 50.

Where the storage unit 100 stores broadcast data, the broadcast data can be stored in the form of a transport stream. In this case, accordingly, it is unnecessary to perform a process for decoding audio data and video data of the broadcast data. Of course, when the stored transport stream is reproduced to externally output the audio and/or video image data of the broadcast data through a speaker and/or screen, it is necessary to perform a process for decoding the stored transport stream by the audio decoder 30 and/or video decoder 40.

Thus, the video digital recording apparatus may have at least one of a function for decoding and reproducing a received transport stream in real time, a function for storing the received transport stream, and a function for reproducing the stored transport stream.

Where the function for reproducing a transport stream received by the video digital recording apparatus in real time is carried out, the transport decoder 20 separates the transport stream into audio, video and PSIP data, and decodes the separated audio, video and PSIP data so that the transport stream is output in the form of a video image and sound. In this case, EPG data extracted from the PSIP data may be displayed on the screen after being separately decoded in accordance with a selection by the user.

On the other hand, where the function for storing the transport stream received by the video digital recording apparatus is carried out, the transport stream can be directly stored in the storage unit 100 without being decoded into audio data and video data.

Also, where the function for reproducing the transport stream stored in the storage unit 100 is carried out, the stored transport stream is read from the storage unit 100. The read transport stream is separated into audio data and video data which are, in turn, decoded, so as to be externally output in the form of a video image and sound.

The user can view a desired broadcast program after immediate-recording or reserved-recording of the broadcast program using the above-described functions of the digital video recording apparatus. In accordance with the digital video recording apparatus and method of the present invention, EPG data is analyzed based on particular program information input by the user, and a preferred program can be automatically recorded based on the results of the analysis.

For easy understanding of the present invention, EPG data will be described in detail. EPG data, which is extracted from data transmitted using a PSIP, means an application enabling the user to receive broadcast programs and associated information via the screen of a broadcast presentation appliance such as a TV. The user can view information about broadcast programs for one day, one week, or a longer period, for example, one month, using EPG data. It is also possible to select or record a desired one of the programs, which are being broadcasted, by selecting an associated channel based on the EPG data. In addition, the user can view the content and details of each program using the EPG data.

The EPG data includes the local start time, length, and title of each program, and additional information about each program. The local start time, length and title of each program are transmitted using an event information table (EIT) of an associated broadcast stream. The additional program information is transmitted using an extended text table (ETT) of the associated broadcast stream.

Figure 2:
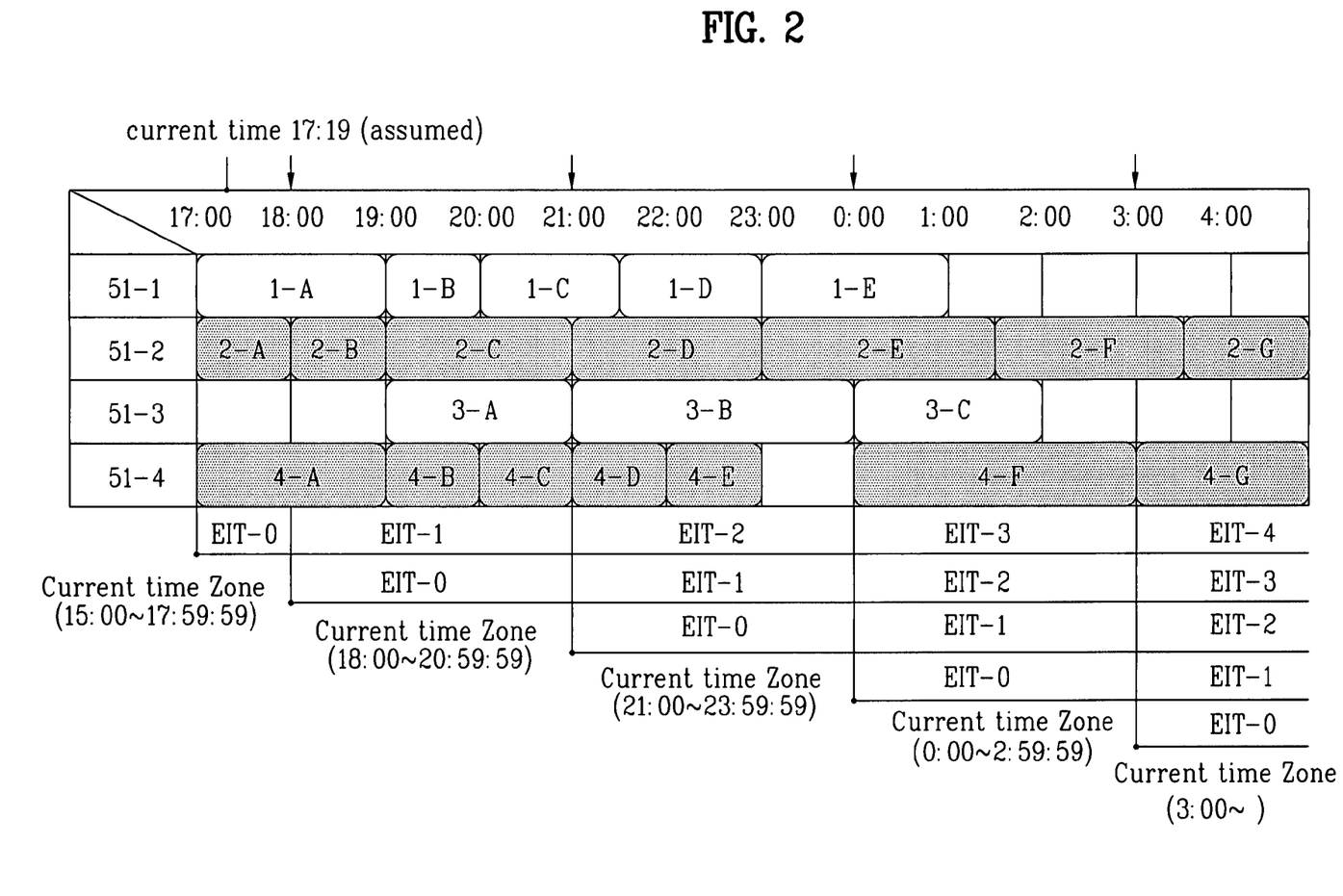
FIG. 2 is a schematic diagram illustrating an example of EPG data displayed on a screen.

FIG. 2 illustrates an example of EPG data displayed on a screen. Hereinafter, an example of a table, in which EPG data transmitted in the form of an EIT to provide broadcast program information is described, will be described with reference to FIG. 2.

In the example of FIG. 2 associated with EPG data displayed on a screen, programs transmitted over one major channel (corresponding to a channel No. 51) and four minor channels in a period of time from 17:00 to 04:00 are shown in the table.

In the table, "1-A", "1-B", ..., and "1-E" represent titles of programs to be broadcasted on Channel 51-1, respectively, and "2-A", ..., and "4-G" represent titles of programs to be broadcasted on the minor channels, respectively. Each block in the table represents a broadcast program, and the length of each block corresponds to the length of the associated broadcast program. Each broadcast program is defined as an event.

In the example of FIG. 2, the EIT is divided into a plurality of EIT sections EIT-0, EIT-1 ... respectively corresponding to successive time zones each having a time span of 3 hours, as shown in the lower end portion of the table. Here, the EIT section EIT-0 corresponds to the current event time zone in which the current time is included. The EIT has a list of events of all channels for every 3-hour time zone. That is, in the illustrated case, the EIT section EIT-0 of the broadcast stream contains events 1-A, 2-A, and 4-A, and the EIT section EIT-1 contains events 1-A, 1-B, 1-C, 2-B, 2-C, 3-A, 4-A, 4-B, and 4-C. Also, the EIT-section EIT-2 contains events 1-C, 1-D, 1-E, 2-D, 2-E, 3-B, 4-D, and 4-E. Similarly, the EIT sections EIT-3 and EIT-4 contain associated events.

When the current time transits to 18:00 in the example of FIG. 2, the current event time zone transits from the time zone of 15:00 to 17:59:59 to 18:00 to the time zone of 18:00 to 20:59:59.

In accordance with the transition of the current event time zone, the events 1-A, 1B, 1-C, 2-B, 2-C, 3-A, 4-A, 4-B, and 4-C, which have been contained in the EIT section EIT-1, are transferred to the EIT section EIT-0. Similarly, the remaining events are transferred to the associated EIT sections EIT-2 and EIT-3. Thus, when transition of the current event time zone occurs, the EIT section corresponding to the time zone "EIT-k" (generally, k=0 to 127) receives the events contained in the EIT section corresponding to the time zone "EIT-(k+1)" as they are.

Figure 3:
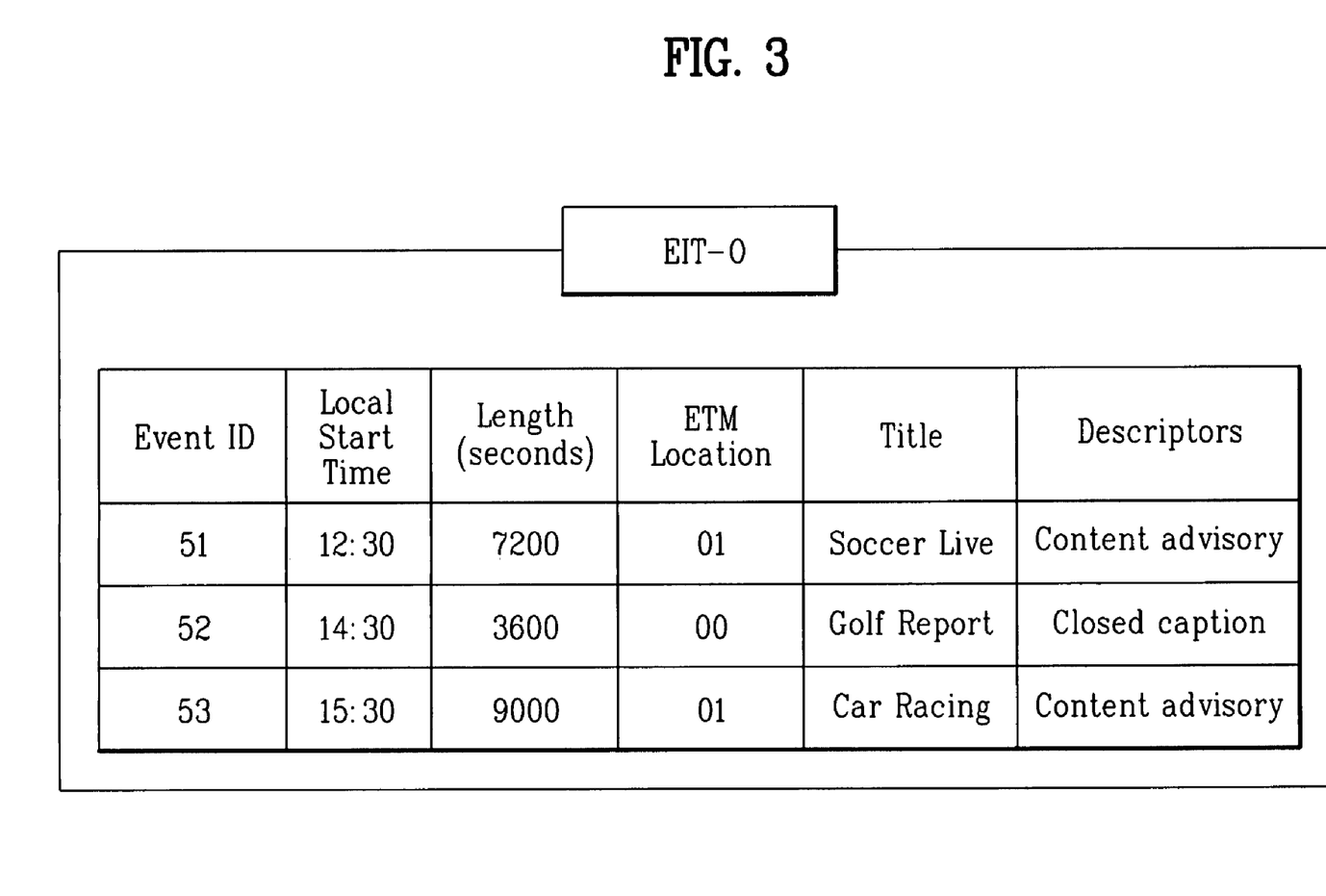
FIG. 3 is a schematic diagram illustrating an example of event information contained in an EIT of a broadcast stream.

FIG. 3 illustrates an example of event information contained in an EIT section EIT-k of a broadcast stream when "k" is 0, namely, an EIT section EIT-0.

In the example of FIG. 3, the information contained in the EIT section EIT-0 includes the ID, local start time, length, title, and descriptor of each event associated with the EIT section EIT-0.

Practically, broadcast programs are identified based on event IDs thereof, respectively. Accordingly, the EIT information about a broadcast program includes the local start time, length, title, etc. of the broadcast program, together with the associated event ID.

In the example of FIG. 3, the descriptor information of the event ID 51 or 53 is illustrated as including "content advisory". The "content advisory" represents information about the level of the associated event. Also, the descriptor information of the event ID 52, namely, "closed caption", is associated with the case in which there is a closed caption in association with the event ID 52. That is, the descriptor information "closed caption" represents attachment of an additional description of a closed caption included in association with the event ID 52.

Meanwhile, the additional information about each event may be transmitted using an ETT of an associated broadcast stream. This function is optional. The ETT includes an extended text message which describes associated events in detail.

Accordingly, when the EIT and ETT included in the PSIP of a broadcast stream are parsed, it is possible to obtain information about events on each channel, for example, the title, local start time, playback time of each event, and detailed information describing each event.

In accordance with the digital video recording apparatus and method of the present invention, information about a preferred program is input from the user, and it is determined whether or not the preferred program is included in an input broadcast stream, based on EPG data obtained by parsing the EIT and ETT of the broadcast stream, in order to automatically record the preferred program when it is determined that the preferred program is included in the broadcast stream.

Hereinafter, the recording method will be described in detail with reference to FIG. 2. When it is assumed that Channels 51-1 to 51-4 in FIG. 2 are sports channels, that is, the category of Channels 51-1 to 51-4 is sports, and the sub-category of programs preferred by the user is golf, the information about the preferred programs can be set as follows. Here, "category" represents the classification of a program, and may have a value of drama, movie, news, etc.

Category: Sports
Sub-category: Golf

The above example corresponds to the case in which information about a preferred program is set using a program classification, namely, a program category. Of course, it is possible to set a preferred program using any information enabling classification of programs, other than category.

Where the category of the preferred program is set and stored using a user interface on a broadcast presentation appliance (not shown), the EPG controller 80 can determine whether or not information corresponding to the preferred program is included in extracted EPG data, after analyzing the extracted EPG data.

When it is determined that the information of the preferred program is included in the extracted EPG data, the digital video recording apparatus according to the present invention stores, in the storage unit 100, a transport stream received on the channel associated with the preferred program at the point of time when the preferred program is broadcasted. This operation may also be repeatedly carried out for newly-received EPG data.

The digital video recording apparatus according to the present invention can automatically record the preferred program, based on the results of analysis of EPG data in the broadcast stream, without a separate reserved-recording setting made by the user.

Figure 4:
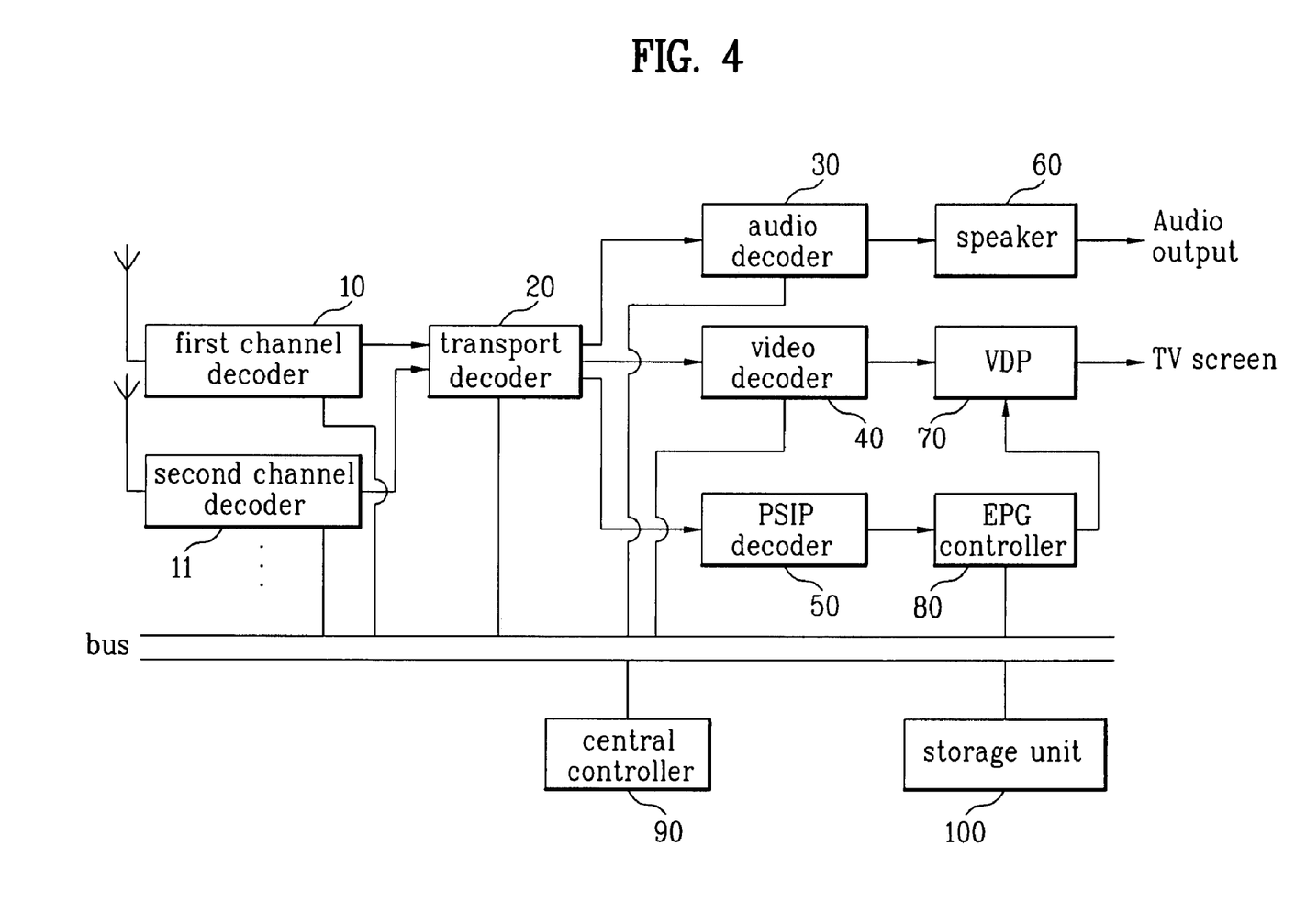
FIG. 4 is a block diagram illustrating a digital video recording apparatus according to another embodiment of the present invention.

FIG. 4 is a block diagram illustrating a digital video recording apparatus according to another embodiment of the present invention. The digital video recording apparatus according to the embodiment of FIG. 4 has a configuration which is similar to that of FIG. 1, but is capable of simultaneously recording data on two or more channels, namely, achieving a multi-channel recording operation.

The embodiment of FIG. 4 is associated with the case in which a multi-channel recording operation can be performed for two channels. That is, the digital video recording apparatus of FIG. 4 includes two channel processors, namely, a first channel processor 10 and a second channel processor 11. The number of channel processors depends on the number of channels for which a multi-channel recording operation is to be carried out. The constituent elements of the digital video recording apparatus shown in FIG. 4, except for the channel processors, may operate in the same manner as described in conjunction with FIG. 1.

The digital video recording apparatus may receive a multi-channel broadcast signal. In this case, different preferred programs on different channels may be simultaneously received by the digital video recording apparatus. For example, in the case of FIG. 2, if all of Channels 51-1 to 51-4 are sports channels, golf games may be simultaneously broadcasted on at least two of the sports channels.

In such a case, the user may previously set the preference order of the channels on which the preferred programs are broadcasted, That is, the preference order of preferred channels may be previously stored in the digital video recording apparatus using a user interface. In this case, the digital video recording apparatus according to the illustrated embodiment of the present invention preferentially records the preferred program on the channel of the highest preference level. Where there is no preference order set by the user, the preferred program on the channel determined in accordance with a certain method may be preferentially recorded. For example, the preferred program on the channel having a channel No. higher or lower than other channels may be preferentially recorded. Otherwise, the preferred program on the channel having a local start time earlier than other channels may be preferentially recorded.

On the other hand, where the digital video recording apparatus is equipped with a plurality of channel processors, for example, two channel processors 10 and 11, as in the case of FIG. 4, it is possible to simultaneously record two preferred programs on two channels of higher preference levels. Also, when the user views the preferred program on one of the channels set to preferential channels, it is possible to record the preferred program on the remaining preferential channel.

In accordance with the digital video recording apparatus of the present invention in which preferred programs are automatically recorded, even when the user desires to view a preferred program, which has already been broadcasted, or is viewing a program other than the preferred program, the user can view the preferred program after completion of the recording of the preferred program, or can view the preferred program while the preferred program is being recorded, using a time shift function.

Figure 5:
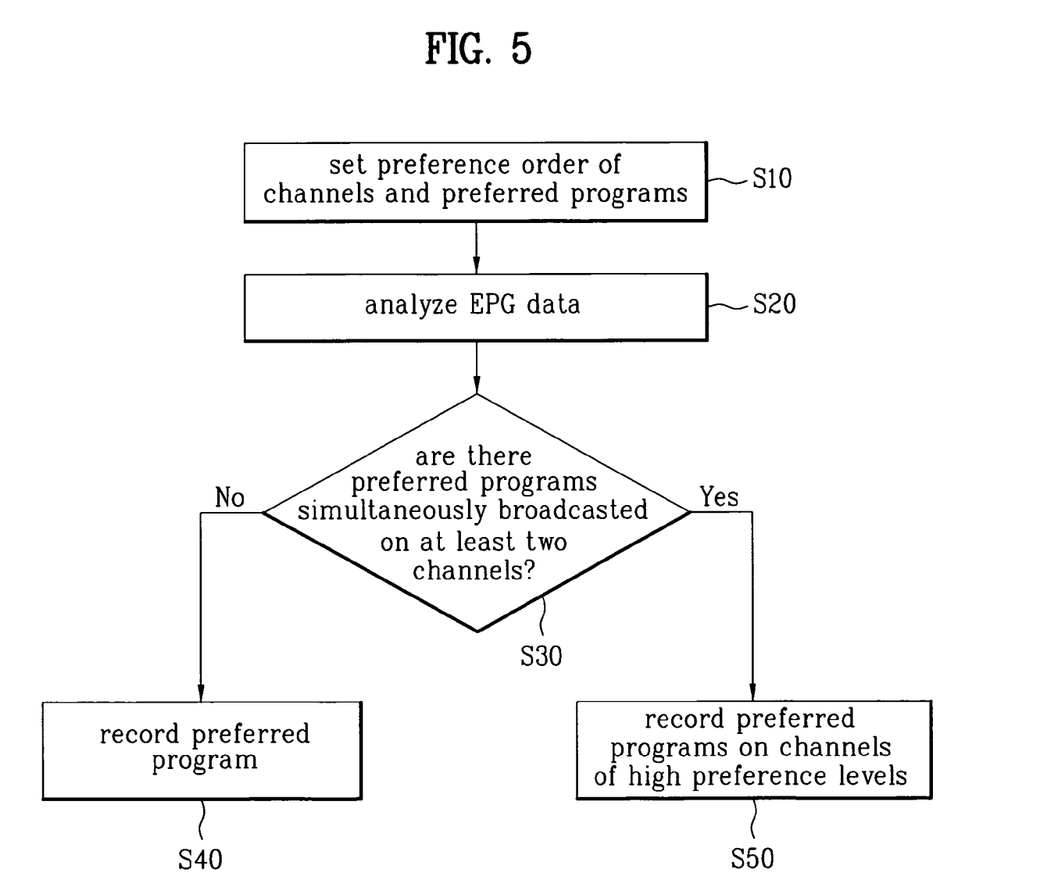
FIG. 5 is a flow chart illustrating an embodiment of the digital video recording method according to the present invention.

FIG. 5 is a flow chart illustrating an embodiment of the digital video recording method according to the present invention. Hereinafter, the digital video recording method according to the present invention will be described with reference to FIG. 5.

In accordance with the digital video recording method, the user can set a channel preference order and preferred programs (S10). The digital video recording apparatus receives EPG data, analyzes the received EPG data, and searches for the set preferred program information (S20).

Based on the results of the analysis, it is possible to determine whether or not there are preferred programs which are simultaneously broadcasted on two or more channels, respectively (S30). When it is determined that there is only one channel, on which a preferred program is broadcasted, this preferred program is recorded (S40).

However, when there are preferred programs which are simultaneously broadcasted on two or more channels, respectively, it is possible to record a number of the preferred programs of higher preference levels which correspond to the number of the channel processors of the digital video recording apparatus (S50).

Meanwhile, the idea of the present invention is also applicable to the case in which EPG data is transmitted using a format of meta data, which is defined at specification such as in a Moving Picture Experts Group-7, in addition to the case in which EPG data is transmitted using a format of EIT or ETT of PSIP.

As apparent from the above description, in accordance with the digital video recording apparatus and method of the present invention, there is convenience in that it is possible to automatically record a program preferred by the user without a requirement for the user to directly check there is a preferred program, to be recorded, in the broadcast stream, or to manually enable recording of the preferred program.

In accordance with the digital video recording apparatus and method of the present invention, the user can view a whole preferred program even when the preferred program has already been broadcasted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital video recording method, comprising:
    (a) receiving information of preferred programs and information about a preference order of multiple channels;
    (b) extracting electronic program guide (EPG) data on the multiple channels, and determining whether or not there is data associated with the preferred programs in the extracted EPG data; and
    (c) when it is determined at step (b) that there is data associated with at least two preferred programs, which are simultaneously broadcasted on associated ones of the multiple channels, preferentially storing ones of the at least two preferred programs which are associated with higher preference-level ones of the multiple channels, respectively.

2. The digital video recording method according to claim 1, wherein the information of the preferred programs and information about the preference order of the multiple channels at step (a) are input via a user interface.

3. The digital video recording method according to claim 1, wherein the information of the preferred programs at step (a) includes at least one of category information of the preferred programs and sub-category information of the preferred programs.

4. The digital video recording method according to claim 1, wherein the data associated with the preferred program at step (b) includes at least one of an event information table (EIT) of a broadcast stream, an extended text table (ETT) of the broadcast stream, and data of the broadcast stream in a format of meta data.

5. A digital broadcast receiving method, the method comprising:
    receiving information about a preferred program and preference information about multiple channels from a user;
    receiving broadcast signals through the multiple channels and extracting data associated with programs from the received broadcast signals; and
    recording the preferred program when the information about the preferred program is included in the data associated with the programs,
    wherein when the preferred program is simultaneously broadcasted on the multiple channels, preferentially recording the preferred program of a channel with a higher preference-level of the multiple channels.

6. The method of claim 5, wherein the information about the preferred program is a category in which the preferred program is included.

7. The method of claim 5, wherein the data associated with the programs is included in an extended text table (ETT) or an event information table (EIT).

8. A digital broadcast receiver, comprising:
    a user interface configured to receive information about a preferred program and preference information about multiple channels from a user;

a reception unit configured to receive broadcast signals through the multiple channels;

a decoder configured to decode data associated with programs from the received broadcast signals;

a controller configured to control the preferred program to be stored when the information about the preferred program is included in the decoded data associated with the programs; and a storage unit configured to store the preferred program, wherein when the preferred program is simultaneously broadcasted on the multiple channels, the preferred program of a channel with a higher preference-level of the multiple channels is preferentially stored.

9. The digital broadcast receiver of claim 8, wherein the information about the preferred program is a category in which the preferred program is included.

10. The digital broadcast receiver of claim 8, wherein the data associated with the programs is included in an extended text table (ETT) or an event information table (EIT).

11. The digital broadcast receiver of claim 8, wherein the data associated with the programs include at least one of a local start time and a title of the preferred program.

* * * * *